United States Patent [19]

Lyloc et al.

[11] Patent Number: 5,197,697
[45] Date of Patent: Mar. 30, 1993

[54] FLY BY WIRE/FLY BY LIGHT CONTROL SYSTEM WITH MANUAL OVERRIDE

[75] Inventors: Woon Lyloc; David C. Pattison, both of Cedar Rapids, Iowa

[73] Assignee: Rockwell International Corporation, Seal Beach, Calif.

[21] Appl. No.: 652,849

[22] Filed: Feb. 8, 1991

[51] Int. Cl.⁵ .............................. B64C 13/18
[52] U.S. Cl. ........................ 244/197; 364/434
[58] Field of Search .......... 244/196, 197, 76 R, 244/75 R, 175

[56] References Cited

U.S. PATENT DOCUMENTS

| | | |
|---|---|---|
| 3,521,839 | 7/1970 | Diani .................................. 244/197 |
| 3,534,930 | 10/1970 | Garren, Jr. et al. ............... 244/76 R |
| 4,132,378 | 1/1979 | Stevens ............................. 244/175 |
| 4,236,685 | 12/1980 | Kissel ............................... 244/197 |
| 4,527,242 | 7/1985 | McElreath et al. ................ 244/196 |
| 4,642,774 | 2/1987 | Centala et al. ..................... 244/197 |

Primary Examiner—Sherman Basinger
Assistant Examiner—Anne E. Bidwell
Attorney, Agent, or Firm—Gregory G. Williams; M. Lee Murrah; H. Fredrick Hamann

[57] ABSTRACT

An improved fly by wire or fly by light system which provides for a smooth manual override of the autopilot function by allowing the pilot to modify the autopilot command to the control surfaces by physically manipulating the yoke to a position different than that commanded by the autopilot.

3 Claims, 1 Drawing Sheet

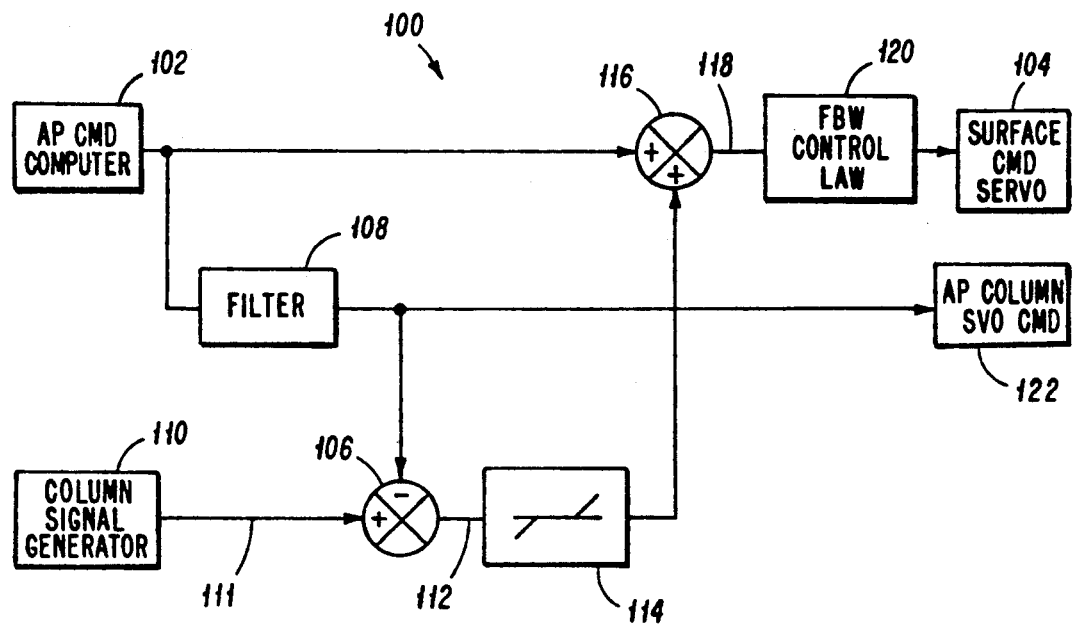

FLY BY WIRE/FLY BY LIGHT CONTROL SYSTEM WITH MANUAL OVERRIDE

BACKGROUND OF THE INVENTION

This invention generally relates to aircraft control systems and more particularly concerns fly-by-wire (FBW) aircraft or fly-by-light (FBL) control systems and even more particularly relates to fly-by-wire or light systems having manual override capabilities.

In the past, aircraft flight control systems have included mechanical linkage, such as cables, from the yoke in the cockpit to the control surfaces on the aircraft. Also, autopilots have been frequently coupled to the cables to automatically drive the control surfaces. One consequence of this mechanical linkage is that the yoke was correspondingly moved, by the cables, whenever the autopilot manipulated the cables to control the control surfaces. This was desirable because it provided the pilot with an indication of what the autopilot was doing.

In recent years, there has been a proposal to eliminate the heavy cables associated with the earlier flight control systems and replace them with a new fly-by-wire system where the yoke sends electronic signals along a signal line to an electronic servo at the control surface. It has also been proposed that an autopilot can be used to generate electronic commands which are sent along the signal lines to the control surfaces.

While this system would have several advantages, it also has several disadvantages. First of all, without the mechanical linkage between the autopilot and the yoke there is no indication to the pilot of what the autopilot is doing. Secondly, any manual override of the autopilot would likely result in switching from autopilot control to manual control and thereby creating a "bump" or disturbance of the control surfaces.

Consequently, there exists a need for improvement in flight control systems which incorporate fly-by-wire or fly-by-light technology and provide for manual override.

SUMMARY OF THE INVENTION

It is an object of the present invention to provide a FBW or FBL system that allows the pilot to override the autopilot without disconnect.

It is a feature of the present invention to include a comparator to compare the autopilot command with the actual position of the yoke and then modify the autopilot command depending on the extent of the deviation between the autopilot command and the actual yoke position.

It is an advantage of the present invention to provide a way for the pilot to modify the autopilot control.

The present invention provides an improved FBW or FBL system which is designed to satisfy the aforementioned needs, produce the above described objects, include the previously discussed features, and achieve the disclosed advantages. The present invention is carried out in a "switch-less" system in the sense that the switching from autopilot to manual mode that would be normally associated with a flight control system when the pilot wishes to override the autopilot is eliminated. Instead, the present invention provides for modifying the autopilot signal in response to manipulation of the yoke by the pilot.

Accordingly, the present invention includes a FBW or FBL system including an autopilot generating autopilot command signals, a yoke apparatus generating column signals and means for comparing the column signal and the autopilot command and adjusting the autopilot command signal to accommodate for differences between the column signal and the autopilot command signal.

A fly by light flight control system comprising:
- a plurality of fiber optic cables;
- an autopilot command computer for generating and transmitting command signals on said plurality of fiber optic cables;
- a column signal generator coupled to said plurality of fiber optic cables for generating a column position signal;
- a control surface servo, coupled with said plurality of fiber optic cables for receiving signals from the plurality of fiber optic cables and for physically manipulating a control surface of an aircraft;
- a column servo coupled with said plurality of fiber optic cables for receiving signals form the autopilot command computer via said plurality of fiber optic cables, the column servo for physically manipulating a yoke in an aircraft cockpit in response to the command signal;
- means for comparing the command signal and the column position signal and generating a deviation signal if the difference between the command signal and the column position signal exceeds a predetermined threshold;
- means for modifying the command signal so that the signal received by the control surface servo is a function of the deviation signal.

BRIEF DESCRIPTION OF THE DRAWINGS

The invention will be understood by a reading of the description in conjunction with the appended drawing, in which: the FIGURE is a circuit diagram of the flight control system of the present invention.

DETAILED DESCRIPTION

Now referring to the FIGURE, there is shown a flight control system generally designated 100. Autopilot command computer 102 is well known in the art and generates a command signal for driving the surface command servo 104. Autopilot computer 102 also provides its signal to comparator 106 via filter 108 which is an operational amplifier configured as a low pass filter and which reduces the yoke activity. Comparator 106 is an operational amplifier configured as a summer. Column signal generator 110 which is an LVDT (linear variable differential transformer) and generates an electronic column signal corresponding to the orientation of the yoke which is transmitted on line 111 and is compared with the autopilot command signal at comparator 106. Line 111 is preferably a conducting wire or a fiber optic cable. Comparator 106 outputs a deviation signal on line 112 corresponding to the difference between the column signal and the autopilot command signal. Line 112 is shown coupled with dead space provider 114 which is an operational amplifier configured as a dead zone, and performs the function of passing only that part of the deviation signal that exceeds a predetermined threshold. That dead space deviation signal is mixed with the autopilot command signal at mixer 116 which is an operational amplifier configured as a summer, to provide a pilot-modified autopilot command signal on line 118 which is then provided to the surface command servo 104. It may be necessary, depending on the particular designers preferences, to include a FBW or FBL control law operator 120, which can be any means to convert the signal on line 118 to an acceptable surface servo command. Autopilot yoke servo 122 provides for mechanical displacement of the yoke so that, it is oriented in a position which would result in no deviation signal on line 112 if the pilot did not physically touch the yoke.

In operation, the flight control system of the present invention provides an autopilot 102 that drives the servos 104 and 122 coupled with both the control surfaces and the yoke. The pilot then can physically force the yoke into a new position, other than that which is commanded by the autopilot, and thereby generating a deviation signal between the autopilot commanded yoke position and the pilot's forced yoke position which is used to modify the autopilot command signal to command the surface servo to include the pilot's modifications.

While the flight control system of the present invention is shown with discrete components performing the several functions, it is contemplated that in many applications that it would be preferable to implement the comparator, mixer and dead spacing function in a digital processor, depending upon the designer's choice.

The autopilot signal drives column servo motor in an attempt to place the column in the corresponding position (as sensed by LVDT 110). The pilot can apply force to control column to force it to be in a different position than commanded by servo 122.

It is thought that the fly-by-wire system of the present invention and many of its attendant advantages will be understood from the foregoing description, and will be apparent that various changes will be made in the form, construction, and the arrangement of the parts in steps thereof without departing from the spirit and scope of the invention or sacrificing all their material advantages, the form herein described being merely preferred or exemplary embodiments thereof.

We claim:

1. An improved flight control system comprising:
   autopilot means for generating command signals;
   means coupled with the autopilot means, for transmitting the command signal;
   yoke signal generator means for generating a yoke signal corresponding to the orientation of a yoke in an aircraft cockpit;
   means coupled with said yoke signal generator means, for transmitting the yoke signal;
   comparator means, coupled with said means coupled with the autopilot means and the means coupled with said yoke signal generator means, for generating a deviation signal corresponding to the difference between said command signal and the yoke signal;
   means for generating a modified command signal as a function of the deviation signal;
   control surface servo means coupled with the means for generating a modified command signal for manipulating an aircraft control surface;
   yoke servo means coupled with a yoke in an aircraft cockpit and further coupled with said means coupled with the autopilot means for transmitting the command signal, the yoke servo means for physically manipulating the yoke in response to the command signal;
   means for modifying the deviation signal and thereby generating a deadened deviation signal where the deadened deviation signal corresponds to that portion of the deviation signal which exceeds a predetermined threshold;
   wherein the means coupled with the autopilot means for transmitting the command signal comprises a conducting wire;
   wherein the means coupled with said yoke signal generator means for transmitting the yoke signal comprises a conducting wire;
   wherein the comparator means comprises an operational amplifier configured as a summer;
   wherein the means for generating a modified command signal as a function of the deviation signal comprises an operational amplifier configured as a summer; and
   wherein the means for modifying the deviation signal comprises an operational amplifier configured as a dead zone.

2. An improved flight control system comprising:
   autopilot mans for generating command signals;
   means coupled with the autopilot means, for transmitting the command signal;
   yoke signal generator means for generating a yoke signal corresponding to the orientation of a yoke in an aircraft cockpit;
   means coupled with said yoke signal generator means, for transmitting the yoke signal;
   comparator means, coupled with said means coupled with the autopilot means and the means coupled with said yoke signal generator means, for generating a deviation signal corresponding to the difference between said command signal and the yoke signal;
   means for generating a modified command signal as a function of the deviation signal;
   control surface servo means coupled with the means for generating a modified command signal for manipulating an aircraft control surface;
   yoke servo means coupled with a yoke in an aircraft cockpit and further coupled with said means coupled with the autopilot means for transmitting the command signal, the yoke servo means for physically manipulating the yoke in response to the command signal;
   means for modifying the deviation signal and thereby generating a deadened deviation signal where the deadened deviation signal corresponds to that portion of the deviation signal which exceeds a predetermined threshold;
   wherein the means coupled with the autopilot means for transmitting the command signal comprises a conducting wire; and
   wherein the means coupled with said yoke signal generator means for transmitting the yoke signal comprises a conducting wire; and
   wherein the comparator means, the means for generating a modified command signal and the means for manipulating the deviation signal comprise a digital processor.

3. A flight control system of claim 2 where the yoke signal generator means comprises a linear variable differential transformer.

* * * * *